United States Patent [19]

Frank

[11] 4,347,582

[45] Aug. 31, 1982

[54] CENTRAL TIMER UNIT FOR BUFFERING CONTROL DATA IN A TELECOMMUNICATIONS SYSTEM

[75] Inventor: Reinhard Frank, Munich, Fed. Rep. of Germany

[73] Assignee: Siemens Corporation, Iselin, N.J.

[21] Appl. No.: 143,159

[22] Filed: Apr. 23, 1980

[51] Int. Cl.³ .................... G06F 13/06; H04M 15/00; H04M 3/00
[52] U.S. Cl. ............................. 364/900; 235/92 TE; 235/92 CC; 179/2 TC; 179/7.1 R; 179/18 EB; 179/18 EE
[58] Field of Search ... 364/200 MS File, 900 MS File, 364/550–551, 569; 179/7.1 R, 2 TC, 16 A, 18 EB, 18 ES, 18 EE; 368/6, 13; 235/92 NG, 92 DP, 92 CC, 92 TE

[56] References Cited

U.S. PATENT DOCUMENTS

| | | | |
|---|---|---|---|
| 3,289,168 | 11/1966 | Walton et al. | 364/200 |
| 3,862,372 | 1/1975 | Deutsch | 179/15 AT |
| 3,885,103 | 5/1975 | Smith et al. | 179/15 AT |
| 3,887,902 | 6/1975 | Labalme | 364/900 |
| 3,916,123 | 10/1975 | Werner et al. | 179/175.2 C |
| 4,001,789 | 1/1977 | Sweet | 364/200 |
| 4,023,143 | 5/1977 | Braunstein | 364/200 |
| 4,074,072 | 2/1978 | Christensen et al. | 179/15 AQ |
| 4,095,266 | 6/1978 | Carubia et al. | 364/200 |
| 4,096,565 | 6/1978 | Ruckdeschel et al. | 364/200 |
| 4,119,803 | 10/1978 | Jacob | 179/15 AT |
| 4,195,339 | 3/1980 | Smith et al. | 364/200 |
| 4,220,990 | 9/1980 | Alles et al. | 364/200 |
| 4,228,499 | 10/1980 | Springolo et al. | 364/200 |
| 4,281,315 | 7/1981 | Bauer et al. | 340/147 R |

FOREIGN PATENT DOCUMENTS

2007401 7/1973 Fed. Rep. of Germany .

*Primary Examiner*—Edward J. Wise
*Assistant Examiner*—A. E. Williams, Jr.
*Attorney, Agent, or Firm*—Spellman, Joel and Pelton

[57] ABSTRACT

In a central timer unit (CTU), incoming stochastically occurring control information, for example dial pulse data, which is to be buffered for execution after individually assigned delay times, is stored in a random access memory (RAM). Address linkage information is written into the RAM, with each piece of received control data, and chains the incoming data to other received data which is to be read from the RAM at the same absolute (real) time. Each piece of control data is automatically retrieved from the RAM, and retransmitted elsewhere in the telecommunications system, after its specified and predetermined buffering time in the CTU. The pieces of buffered data are individually linked to the CTU's internal time base, which is developed by a clock generator coupled to ring counter driven, hierarchially arranged, time control units. Each of these sequentially arranged timer units also includes memory elements for storing the RAM addresses of buffered data items which will time-out in a particular cyclic period associated with that particular timer unit. The CTU further includes an internal control device, having an adder unit, which determines execution times for incoming data by combining delay time values and internal storage times. Bi-directional address linking is also taught, thereby facilitating cancellation of void pieces of buffered data, prior to their respective execution times, without disturbing non-cancelled data.

10 Claims, 1 Drawing Figure

4,347,582

CENTRAL TIMER UNIT FOR BUFFERING CONTROL DATA IN A TELECOMMUNICATIONS SYSTEM

BACKGROUND OF THE INVENTION

The invention is directed to circuit arrangements for telecommunication systems and more specifically to a central timer unit of a telecommunication system for buffering of pieces of control information received in random order and to be sent out after individual delay times associated with each respective piece of information, and to a method for buffering the same pieces of control information.

More specifically, the pieces of control information may represent control instructions composed of a device address and a control command. The device address specifies a specific device of the telecommunications system whereas the control command designates the type of operation to be performed by the addressed device. In the following, some basic examples may be given for different groups of such control instructions;

A control instruction may comprise a monitoring instruction utilized, as it is known, for checking whether a switching process occurs in a correct sequence in time. A practical example is a test for distinguishing dial pulses from release pulses. Both types of pulses occur in the form of interruptions of a signal on a suscriber line loop. Dial pulses have a distinctively shorter duration than release pulses, assuming that dial pulses are supposed to last not longer than 85 ms, whereas a pulse lasting at least 100 ms is evaluated as a release pulse. Whenever such a pulse on a subscriber line loop occurs, automatically a monitoring instruction is set up for execution after 85 ms which instruction causes at this time a test of the switching state of the respective subscriber line. Also, the pulse intervals between dial pulses within a dial pulse train are monitored. The pulse intervals between the dial pulses of one and the same dial pulse train shall have a fixed maximum duration, thus being clearly distinguished from inter-digit pulses between successive dial pulse trains which have a much longer duration. By testing such pulses the end of the dial pulse train can be observed.

Control instructions may also serve to start switching processes By means of control instructions executed successively staggered in time, the aforementioned dial pulse trains can be simulated by activating a pulse sending relay by one control instruction and by resetting this relay into resting position by a subsequently following control instruction. A series of these steps simulates a complete pulse train. Many other applications of such control instructions are used to perform monitoring and control operations in a switching system.

A main characteristic with regard to buffering of such control information is that a multiplicity of operations are executed simultaneously in a complex switching system under control of instructions each specifying a different operation and being executed after varying delay times. The design concept of a buffer memory for this application, therefore, has to reflect the random order of the occurrence of these pieces of control information and the individual delay times as specified by a predetermined time span between activating and executing a respective piece of control information. In addition, because of the stochastic nature of this information, different items of control information have to be buffered such that they can be retrieved for execution at the same time.

A known buffer memory for a central timer unit comprises two different storage means. Each piece of control information is stored in a respective memory location of a random access memory. These memory locations, which comprise plural bits of memory, are hereinafter designated as storage cells. For addressing a buffered piece of control information at execution time there is provided a second group of storage means hereinafter designated as storage units. These storage units, each designed for storing an address of a storage cell, are arranged in series such that they can be selected sequentially and repeatedly, during consecutive time intervals determined by an internal clock pulse train. Thus, an internal time base of the central timer unit is established wherein each time interval represents a so-called storage time value. Each piece of control information to be buffered is associated with a delay time value which can be translated into an absolute execution time value by adding this delay time value to the current value of the storage time. The result is a new storage time value specifying the time interval when the respective buffered piece of control information is to be read out of the random access memory for delivering this information or a part of it to the addressed device of the telecommunication system. This new storage time value designates a specific storage unit containing the address of a storage cell of the random access memory which storage cell, in turn, holds the piece of control information to be executed. This indirect addressing scheme allows proper queuing of control information in the buffer of the central time unit.

The stochastic occurrence of control information, however, also means that often more than one piece of control information has to be read out during one time interval of the execution time. This results in an address conflict of the above-mentioned addressing scheme, unless the capacity of each storage unit is designed for a maximum load, i.e. all addresses of different pieces of control information to be executed at the same time can be stored in one storage units.

The high consumption of storage capacity of this approach can be avoided by address linking wherein each storage cell of the random access memory further more comprises an independently accessible storage element suitable for storing the address of another storage cell. If applicable another piece of control information which has to be exeucted at the same time is stored at this memory location. Since each storage cell contains such a storage element for such a chain address, a string of pieces of control information can be buffered for retrieval at the same time.

The above-described address linking saves storage capacity, but has the disadvantage of requiring a number of address operations to be performed whenever a new member to the chain of indefinite length has to be added. Furthermore, cancelling of a piece of control information prior to execution time is complicated. This condition applies when a piece of control information becomes void at execution time. This can happen, for example, in respect to monitoring instructions for a switching process which is terminated prematurely or which has not to take place at all. Switching signals of a properly operating system maintain, as a rule, given time conditions, and it is to be expected that respective control instructions monitoring the switching process usually are obsolete prior to executing. It would create an unreasonable overhead to the storage means of the central timer unit if void control information would not be cancelled. The restriction of the above described chaining scheme for reallocating of addresses of a chain of storage cells, however, complicates replacement of void control information.

A second aspect for determining the capacity of the storage means of the central timer unit is the characteristic of the time interval pattern as defined by its length reflecting the maximum time span between activating and executing control information which represents the maximum storage time value, and by its fineness determining the number of storage units for establishing the internal time base. In other words, a multiplicity of storage units is necessary if the telecommunication system requires a very finely divided pattern of time intervals because of sharply staggered execution time values in combination with a relatively high maximum storage time value.

The range of variation of delay times of control information, and a certain fineness of staggering of execution times, therefore, define the length of the series of storage units. It is, therefore, an object of the present invention to provide an improved central timer unit of a telecommunication system suitable for operating a multiplicity of pieces of control information activated and received in random order which pieces of control information are associated with varying delay time and have to be executed at densely differentiated execution time values.

Another object of the present invention is to provide a central timer unit of a telecommunication system having optimized storage capacity for buffering such control information.

Still another object of the invention is to provide an improved central timer unit which is suitable for easily cancelling of buffered pieces of control information by means of a reduced number of control operations in the central timer unit.

SUMMARY OF THE INVENTION

The aforementioned, and other objects of the invention are achieved according to the invention, by a central timer unit of a telecommunication system having random access memory composed of storage cells wherein each storage cell is assigned for storing data of a piece of control information and a chain address of another storage cell, if more than one piece of control information has to be read out at the same time. There is also provided a plurality of time control units arranged in a hierarchy according to different operating rates. Each time control unit includes a series of storage units for storing a random access memory address and a read selector for scanning the storage units sequentially and repeatedly. These time control units are of similar design but operate at different rates, wherein preferably the revolution time of a complete scanning procedure of a clock unit specifies the time controls pulse rate of the neighboring clock unit of the next higher level running at a lower operating rate. A write selector is assigned to the time control units for selecting a storage unit based upon the highest non-zero digit of the individual delay time value of a piece of control information. A selected storage unit stores a random access memory address of the storage cell where the respective piece of control information is stored. There is also provided a control device having an input buffer for temporarily storing an incoming piece of control information; an output device for transmitting outgoing control information, and control means for controlling of data transmission within the central timer unit. Transmitting procedures refer to address data and pieces of control information in transit between the aforementioned units and devices of the central timer unit. The control means, above all, are designed such that the address of a piece of control information read out of a storage unit of one time control unit is handed down to the neighboring time control unit in the hierarchy whenever a respective digit of the storage time value of the associated storage unit is selected.

The structure of the central timer unit according to the present invention is such that the hierarchy of time control units in its performance can be compared to a digital clock, for example, displaying hours, minutes and seconds if composed of three units, whereby each one of these units is assigned to one of these values. Each piece of control information is first queued according to an hour value and is rearranged according to a minute value at the respective hour and if not being void in the meantime, and to a second value accordingly. Execution time values thus are defined in periods of seconds without the need of constructing a timer representing the dense time pattern for the maximal time span counting, in this example, at least twelve hours. It should be understood that the operating rates of the time control units actually are much higher and that there is no requirement in a telecommunication system to buffer control information for hours.

The time control unit of highest level running at lowermost operation rate determines by its revolution time the range of variation of delay time for buffered control information whereas the time control unit of lowest level determines by its operation rate which is controlled by the internal clock pulse generator the fineness of intervals of the execution time. The time interval between two counting pulses establishes the basic unit of time for staggering execution times. The hierarchy of time control units, therefore, represents an efficient solution for both requirements, a relatively wide range of variation of delay times and a relatively high fineness of time interval pattern. This allows for staggering of the storable time spans at optimized storage costs.

The structure can be easily expanded by an adequate design of the storage cells of the random access memory for storing chain addresses for forward direction and return direction. This redundancy means that each member of a string of storage cells linked by chain addresses comprises data directly pointing to the preceding storage cell and to the succeding storage cell of this string. For cancelling of a void control information, the respective storage cell can be easily drawn out of the chain by replacing the forward chain address stored in the preceding storage cell by the forward chain address stored in the storage cell to be erased, and the return chain address of the succeeding storage cell, accordingly. There is no impact on the other remaining storage cells of the string. Address linking in both directions, therefore, requires a reduced number of replacement operations and is most effective since a variety of pieces of buffered control information will already be cancelled-as mentioned above-prior to their respective execution time.

BRIEF DESCRIPTION OF THE DRAWINGS

For a full understanding of the present invention, reference should now be made to the following detailed description of one preferred embodiment of the invention in conjunction with the accompanying drawing, wherein the single FIGURE represents a schematic block diagram of a central timer unit of a telecommunication system for buffering control information received in random order.

DETAILED DESCRIPTION OF THE PREFERRED EMBODIMENT

Figure 1:
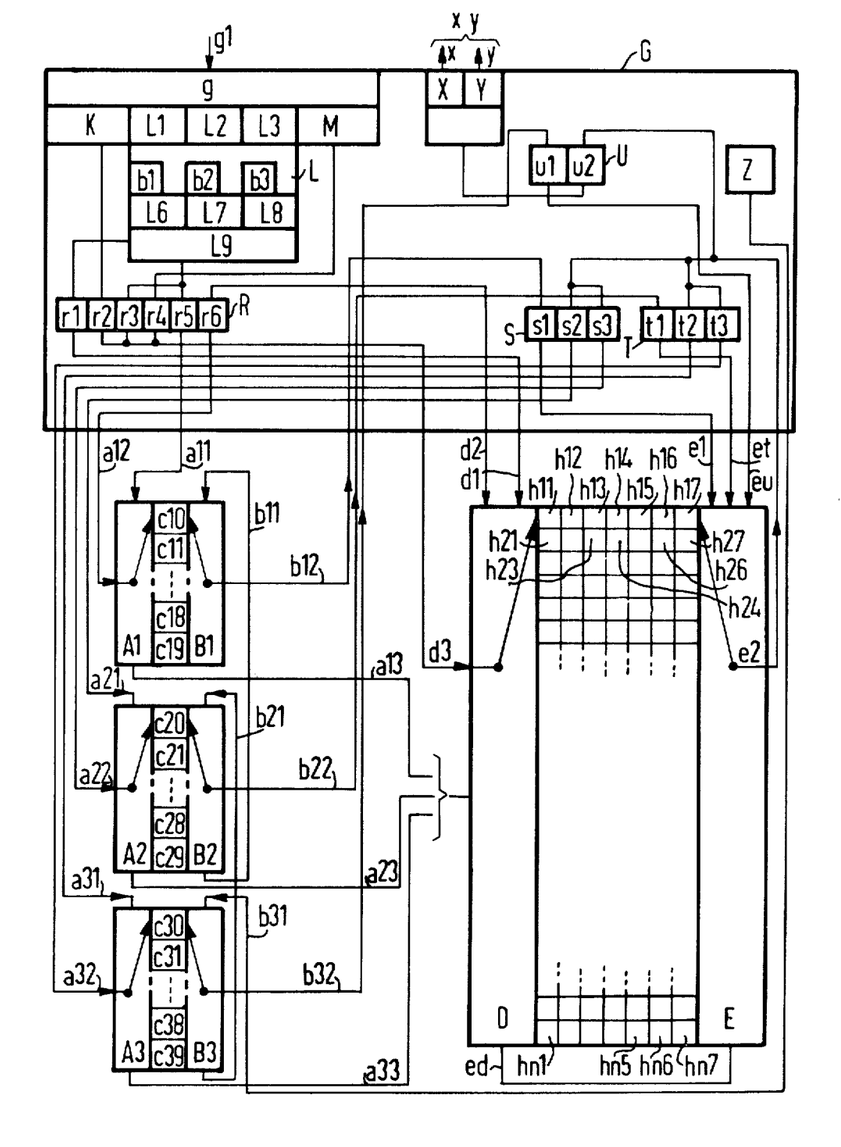

An embodiment of the present invention is shown in a single FIGURE of the drawings. For the reason of clarity, the drawing has been generalized to some extent for emphasizing the main features for better comprehension of the basic design. Those skilled in the art may thus obtain from the following broad and detailed description of a central timer unit more useful and sufficient information on the logic interrelationship of the described main units for constructing an actual layout of the design. Furthermore, as centrally controlled telephone exchange systems are already well known in the art, the description of the invention is limited to the central timer unit itself. Also, for the same reason of clarity, a short introduction with respect to concept and terms used in the later detailed description, is given below:

The central timer unit basically is a storage unit for handling timely related pieces of control information, hereinafter called time instructions. A time instruction is understood to embrace information about a control operation or a test which has to be executed at a specific moment. The type of control operation or test is specified by a control instruction comprising a device address and a control command. The device address states a specific unit of the switching equipment. Such units of the switching equipment may be internal connection circuits, line termination circuits of local and long-distance connection lines, selection receiving devices, subscriber access circuits, and the like. The control command indicates what is to be done in the addressed unit, i.e. whether a switching process has to be started or terminated and what kind of switching process has to be performed. Whereas switching processes may include dial pulse transmission and generating of count pulses, etc. it may also have to be monitored whether an incoming pulse is received within certain time limits, e.g. to recognize dial pulses and to separate such pulses from a longer pulse causing the release of a connection.

As mentioned, the time instruction also has to specify the execution time. The execution time is not defined by an absolute value, rather than by a relative quantity called delay time value. This delay time value states a definite time span counting from the moment when the time instruction has been received by the central timer unit up to the moment when the control instruction has to be executed. The moment when a time instruction is received is called the storage time value. The execution time value, therefore, is determined by the sum of the storage time value and the respective delay time value. To specify the execution time distinctly, all three mentioned time values consist of several digits, in the present embodiment specifically of three digits defining a seconds value, a tenths of a second value and a hundredths of a second value.

A characteristic of the time instructions is that they are directed to the central timer unit asynchronously with resepct to the pool of already buffered time instructions. A received time instruction has to be queued in the correct timely order by the central timer unit. Also, buffered time instructions may become invalid prior to their execution depending on events within the system. For example, the duration of a pulse has not to be checked any longer at the execution time when this pulse has been reset in the meantime. The central timer unit, therefore, has to respond flexibly to input information and to re-allocate the buffered time instructions.

The central timer unit, shown in the drawing, comprises three main units or groups of units, a control device G, three time control units each comprising a series of storage units c10 to c19, c20 to c29 and c30 to c39, and a random access memory, hereinafter called instruction memory containing a plurality of addressable memory locations h11 to h17, h21 to h27 and hn1 to hn7, hereinafter called storage cells. Each of the series of storage units c10 to c19, c20 to c29 and c30 to c39, respectively are to be selected assembled in cyclic sequence.

Basically the control device G controls the buffering of time instructions including write and read operations; the three series of storage units c10 to c19, c20 to c29 and c30 to c39 form three interrelated clock units and will be designated as such for tracing the call up procedures for buffered time instructions at their individual execution times; and the instruction memory serves to store a complete time instruction in each storage cell consisting of seven storage elements h11 to h17. The storage elements are hereinafter understood as to be the smallest independently accessible units of the instruction memory each storing a part of a time instruction.

The control device G is composed of an input device g connected to an input line g1 over which time instructions are received by the central timer unit. Part of the input device is a memory unit consisting of a device address buffer K, three digit buffers L1, L2 and L3 for storing a respective one of the digits of the delay time value and a control command buffer M; the memory unit is designed such that the buffers are readable independently for reading operations.

An adder L is connected to the three digit buffers L1, L2 and L3. As will become more apparent later, the current storage time value of the central timer unit is stored digit by digit in three input registers b1, b2 and b3 of the adder L. The adder L serves to add respective digits of the delay time value and the current storage time value thus calculating the execution time value. This value of the execution time is stored in three output registers L6, L7 and L8 of the adder L. Carries are performed in a known manner, if the sum of two respective digits of the delay time value and the storage time value exceeds the value "10". For example, if the sum of the hundredths of a second digits stored in the third digit buffer L3 and the third input register b3, respectively exceeds the value 10, a carry value will be added to the sum of the digits contained in the second buffer L2 and the second input register b2 each representing a tenths of a second value. The calculated digits of the execution time value are then stored temporarily in the respective output registers L6 to L8 of the adder L. Thus, the first output registers L6 contains the seconds digit of the execution time value, the second output register L7 holds the tenths of a second digit and the third output register L8 stores the hundredths of a second digit. Connected to the output registers of the adder L is an output device L9 which, in turn, is connected to a first gate circuit R consisting of six gates r1 to r6. The control device G comprises three more gate circuits S, T and U. Each of the second and third gate circuits S and T consists of three gates s1 to s3 and t1 to t3, respectively; whereas the fourth gate circuit U is composed of two gates u1 and u2. The respective connections and the operations performed by these gate circuits will be described later in detail, in the moment it shall be understood that under control of these gate circuits, the different parts a time instruction can be transmitted independently between different units of the central timer unit or to an output device X, Y of the control device G. Furthermore, the control device G also contains a central clock generator Z.

Referring now more specifically to the three time control units, each unit is identically designed and consists of ten storage units. To the input side of each time control unit there is assigned a respective one of first write selectors A1, A2 and A3. Likewise, to the output side of each time control unit there is assigned one of three read selector devices designed for selecting the assigned storage units cyclically. The read selectors, therefore, are composed of ring counters B1, B2 and B3 and will hereinafter be designated as such. These counters are supplied by clock pulses in such a manner that they form a hierarchy of counters, which means that the second counter B2 is clocked ten times faster than the first counter B1 and the third counter B3, in turn, is clocked ten times faster than the second counter B2.

This is achieved by connecting the third counter B3 directly to the central clock generator Z via a clock line b31. Let it be assumed that the clock pulses are delivered by the central clock generator Z at intervals of 10 ms. Accordingly, the third counter B3 is advanced every 10 ms by one counting step and completes a revolution after ten counting steps. Such a revolution is designated as a call cycle. This term refers to the function of the counter which selects in successive counting steps each one of the assigned storage units in a cyclic sequence. Upon selecting a specific storage unit during a counter step the contents of a selected storage unit is read out and delivered via a respective output line b12, b22 and b32 for further processing. Details of this procedure will be described later.

The third counter B3 completes its call cycle within $10 \times 10$ ms which is 100 ms. During a call cycle of the third counter B3 the storage units c30 through c39 are selected successively; upon completing a call cycle the first storage unit c30 is selected again. In starting a new call cycle, the third counter B3 delivers a carry signal via a clock pulse line b21 to the second counter B2. The second counter B2, therefore, receives a counting pulse every 100 ms. Accordingly, it will select the storage units c20 to c29 for a respective read operation in a successive order during a call cycle lasting $10 \times 100$ ms or 1 s. Upon completing the call cycle the second counter B2 delivers a carry signal to the first counter B1 via a clock pulse line b11. This carry signal is a counting pulse for the first counter B1. The similar operation of the first counter B1 results in a respective call cycle which lasts 10 s.

In summary, the described read circuitry comprising the three counters B1, B2 and B3 because of its cyclical operating characteristic and forms the internal clock of the central timer unit which covers a time span up to ten seconds in steps of 10 ms. Every time instruction which is received by the central timer unit has to be linked to this internal time base. This is achieved by storing the current state of the three counters B1, B2 and B3 in the input registers b1, b2 and b3 as described above. The execution time of a time instruction with respect to this internal time base thus is calculated by the adder L.

In general, this execution time information forms an address for selecting a storage unit of the time control units. In the storage unit information is stored which specifies the respective time instruction rather than comprises the instruction itself. This indirect addressing scheme allows for changing the queue of buffered instructions and for retrieving several time instructions for execution during one 10 ms period of the entire time span. The overall concept is to select a specific storage unit at execution time in order to obtain the address of a storage cell of the instruction memory where, in turn, the whole information necessary for executing the time instruction is stored. This indirect addressing scheme has the advantage that a time instruction can be randomly stored in the instruction memory resulting in very flexible queuing of time instructions.

The instruction memory comprising n storage cells has a write selector D and a read selector E both devices being independently addressable for random access to one of the storage cells. The storage cells are composed of seven storage elements which are separately accessible. The second storage cell, for example, consists of the elements h21 to h27. The first storage element h21 is provided for storing the device address of a time instruction. Each of the next three elements h22, h23 and h24 is assigned to a respective one of the digits of the execution time. The fifth element h25 contains the control command. The sixth and the seventh elements h26 and h27 of the storage cell each are provided for storing a chaining address for return direction and forward direction, hereinafter called return address and forward address, respectively. The object of these two storage elements and the stored contents, in general, is to chain an undefinite queue of time instructions which have to be executed at the same time. According to the above-mentioned general concept, a time instruction will be made available at its execution time by storing an address of the instruction memory in a respective storage unit of a time control unit which is automatically read out at the desired moment. Every time when more than one time instruction has to be called during a 10 ms period of the execution time, this concept would fail if the central timer unit would not be provided with a characteristic to select more than one time instruction, if necessary. This is achieved by chaining time instructions which have to be executed at the same time by use of the contents of the sixth and seventh elements. Such a chain address points to another storage cell of the instruction memory where another time instruction to be executed at the same time is stored. Details of the chaining operation will be described later; for the moment it may be sufficient to know that for establishing and for resolving a chain addresses of both neighboring instructions of the chain are stored.

The read selector E of the instruction memory serves to select a storage cell and read out the stored contents. It has been pointed out that a storage cell comprises a group of storage elements, e.g. h11 to h17. The design of the reading device E and of the instruction memory is such that upon selection of a memory cell each element can be read out separately. The read selector E either performs destructive reading operations or leaves the respective storage contents unerased depending on a particular operation. The selection of a storage cell by the read selector E is activated by an address received across each of the address lines el, et and eu. Information selected by the read selector E is read out via an information line e2 toward the second gates s2 and t2 of the second gate circuit S and the third gate circuit T, respectively. Having described the structure of the central timer unit in general, in the following a more specific and detailed description of several units may be represented in conjunction with a description of the operation of the central timer unit.

It has already been mentioned that a time instruction is received by the central timer unit via the input line gl by the input device g. The respective parts of the transmitted time instruction are temporarily stored in the buffers K, L1 to L3 and M. Thereupon the adder L calculates the execution time of the temporarily stored time instruction dependent on the internal time base, as described above and delivers the calculated digit values of the execution time to its output device L9.

The output device L9 first furnishes a signal to the first gate r1 of the gate circuit R which signal is transmitted as a starting signal to an input d1 of the write selector D of the instruction memory. Having received this starting signal the write selector D starts to check the contents of the instruction memory for a free storage cell until the first free storage cell is found. The address of this free storage cell is offered to the write selector A1 of the first time control unit via the sixth gate r6 of the first gate circuit R. This sixth gate is activated as soon as the gate circuit R recognizes that the write selector D delivers an address along the output line d2. Thereupon the first gate circuit R deactivates its first gate r1 and closes the second gate r2. Across this gate the device address temporarily stored in the device address buffer K is transmitted to an information input d3 of the write selector D. Assuming that the second storage cell consisting of storage elements h21 to h27 has been selected, the transmitted device address will be stored in its first storage element h21. Thereafter the first gate circuit R deactivates the second gate r2 and closes the gates r3, r4 and r5 one after another, thus controlling the transmission of the three digits of the execution time value of the buffered time instruction to the instruction memory. These digits are stored in respective storage elements h22, h23 and h24.

As soon as the digits of the execution time are stored in the instruction memory the third gate r3 of the first gate circuit R is open and the fourth gate r4 is closed thereby closing a circuit between the control command buffer and the write selector D of the instruction memory. The contents of this buffer is stored in the fifth memory element of the selected storage cell.

Having stored the control command in the fifth element h25 of the selected storage cell, the entire data of the time instruction to be queued is stored in the instruction memory. Simultaneously to these writing operations the fifth gate r5 of the first gate circuit R has been activated to close a connection between the output device L9 of the adder L and an address input of the write selector A1 of the first time control unit via an address line al1. Along this line the seconds value, the first digit of the execution time value of the buffered time instruction is transmitted to the write selector A1. There, the transmitted information is interpreted as an address of a storage unit, for example c18, which storage unit thereupon is selected by the write selector A1.

This setting shows, relative to the current state of the first counter B1, a precession corresponding to the difference between the seconds values of the execution time and the current storage time.

Upon selecting the addressed storage unit c18, the associated write selector A1 checks whether the selected storage unit is empty. In practice, a selected storage unit normally will be already occupied by a time instruction previously queued for execution. However, let it be assumed that the selected storage unit c18 is still free. In this case, the write selector A1 of the first time control unit sends a request signal to the write selector D of the instruction memory via an address line a13 causing this write selector to deliver a second time the address of the storage cell previously selected for storing the time instruction. This address is transmitted to the write selector A1 of the time control unit as soon as the first gate circuit R activates the sixth gate r6 after resetting the fifth gate r5. By activating the sixth gate r6 a connection is established between the write selector D of the instruction memory and the information input of the write selector A1 which stores the transmitted cell address in the selected storage unit. At the respective execution time this storage unit will be selected by the first counter B1 for a read operation and the respective information read out from the selected storage unit will be transferred to the read selector E of the instruction memory via a first gate s1 of the second gate circuit S for selecting the storage cell in the instruction memory defined by that address.

Referring now to the usual case that the selected storage unit c12, for example, already contains an address of a storage cell of the instruction memory. In this case a chain operation has to be performed to chain the time instruction previously queued to the currently processed time instruction. This is achieved by linking addresses of the respective storage cells in the instruction memory. Let it be assumed that a group of three time instructions have to be called up together for execution when the storage unit c12 is selected by the first counter B1. These three time instructions occupy different storage cells in the instruction memory; for example, the first time instruction is stored in the second cell consisting of storage elements h21 to h27, the second time instruction is stored in the first storage cell consisting of storage elements h11 to h17 and the third time instruction is assigned to the n-th storage cell consisting of storage element hn1 to hn7. In this example, the seventh storage element 27 of the second storage cell contains the address of the second time instruction, this means the address of the first cell of the instruction memory. The contents of the seventh storage element h17 of this first cell points to the third time instruction by means of the address of the n-th cell. Thus, the addresses in the seventh storage elements are forward chain addresses. Since the second time instruction is assigned to the first cell its sixth element h16 contains the address of the second storage cell which is assigned to the first time instruction. Addresses stored in the sixth elements of the storage cells are, therefore, return chain addresses. This example of a chain of three time instructions and respective storage cells does not mean a restriction, since depending on the occupancy of the central timer unit there may be even longer chains.

Assuming now, in respect with the aforementioned example, that the third time instruction is the one which has to be queued. In this case forward and return chain addresses of the first two time instructions have already been stored in the respective storage elements. When the write selector A1 of the first time control unit checks the selected storage unit c12 whether it is empty then the address of the second cell of the instruction memory occupied by the first time instruction will be recognized. Thereupon, the write selector A1 reads this data in a non-destructive read operation and transmits the address to the write selector D of the instruction memory along the address line a13. This operation is interpreted by the write selector D such that a chain operation has to be performed. Having received this address, the write selector D selects the second storage cell for storing the forward chain address in the seventh element h27. In the assumed example, this storage element, however, is already occupied.

As a result of this test the write selector D transmits to the read selector E of the instruction memory the address of the checked storage cell together with a command to read the forward address contained in the storage element h27. The read selector E executes this command and transfers this forward address, the address of the first cell to the write selector D. This address transfer is performed across an address line ed connecting the write selector D and the read selector E. With this address the writing device D selects now the first storage cell and checks again the seventh storage element h17. If it also is already occupied, the write selector D again would have to transmit a reading command to the read selector E, as above, and receives another forward chain address. According to the chosen example, however, the seventh element h17 of the first storage cell is empty. The write selector D thereupon enters the address of the n-th storage cell as forward address in the seventh element h17. Similar operations and address transfers between the write selector D and the read selector E are performed to obtain return chain addresses, which will be stored in the sixth elements of the respective storage cells.

The linking of storage cells in both directions is necessary to rearrange the chain if one of the chained time instructions becomes void prior to its execution. A time instruction for monitoring a switching process during a specific time span becomes void if the switching process already has taken place prior to the execution time. Let it be assumed now that the second time instruction of the above-mentioned example of a chain has to be replaced. Accordingly, the storage contents of all storage elements related to this instruction have to be erased. Both the write selector D and the read selector E of the instruction memory will take part in this operation. The read selector E selects at first, the storage cell containing the information for the time instruction to be replaced. The contents of the sixth and seventh storage elements are read out and the respective return and forward chain addresses. Thereupon, the whole contents of the selected storage cell are erased.

The read selector E transfers in a successive order the return chain address and the forward chain address to the write selector D. This device first selects the second storage cell by means of the first received address (return chain address) and replaces there in the seventh storage element 27 the stored forward address by the second address (forward chain address) received from the reading device E. Thereupon the write selector addresses by means of the forward chain address the n-th storage cell for replacing in its sixth storage element hn6 the previously stored chain address by the received return chain address. Thus rearranging a chain when cancelling a time instruction takes place simply by means of both chain addresses and the contents of the instruction memory are easily updated utilizing information stored in this memory.

Having described how a time instruction is queued in the central timer unit, the following description will refer to the execution of a time instruction. Again, this operation will be explained with respect to the above example with address chaining of three storage cells headed by the storage unit c12 of the first time control unit and consisting of time instructions stored in the second, the first and the n-th storage cells of the instruction memory, respectively.

The first counter B1 selects the storage unit c12 during the call cycle. This storage unit will be read out and all three chained time instructions are called up one after another. This is achieved by transferring, the address stored in the storage unit c12 via the output line b12 of the first counter B1 to the first gate s1 of the second gate circuit S. Due to the receipt of this address the second gate circuit S activates its first gate s1 and this address is sent across the address line e1 to the read selector E. The transfer of the address across the first address line e1 of the read selector E results in two consequences: by receiving an address across this address line the read selector E recognizes that this address originates from the first time control unit. This event is associated a specific value of seconds of the execution time. The read selector E thereupon selects the addressed second storage cell for reading out the third storage element h23. This means that in any case when an address is received from the first time control unit, a tenths of a second value or the second digit of the execution time value has to be read out. The second gate circuit S activates its second gate s2 to establish a connection between the information output of the read selector E and the address input of the second write selector A2 across the information line e2 and the respective address line a21. Upon receipt of this data the second write selector A2 starts a queuing operation on the tenths of a second level as has been already described in connection with the operation of the first write selector A1 with reference to the second value level. All operations including chaining of addresses are performed now on the tenth of a second level correspondingly. Detailed description therefore is deemed not to be necessary.

Because of the assumed address chain of three storage units a check of the seventh storage element h27 by the read selector E will be positive; and the forward chain address is read out. Continuing the queuing operation on the tenths of a second level for the second time instruction the read selector E selects by means of this forward chain address the first storage cell consisting of storage elements h11 to h17 and occupied by the second time instruction. For this time instruction and accordingly for all following members of a chain the respective queuing operation on the tenths of a second level will take place by addressing the second write selector A2 in the above-described manner.

In summary, whenever one of the storage units c10 to c19 is selected by the first counter B1 the address chaining of linked time instructions on this second-level is resolved. The reading operation performed by the counter B1 is a destructive operation erasing the contents of the respective storage unit. The read selector E activated by the transferred data successively addresses chained storage cells in the instruction memory. The tenths of a second value is read in each case during this successive order of operation for establishing a new queue for each of the selected time instructions on the next lower, the tenths of a second level. The read selector E cooperates with the second gate circuit S for transmitting address information across the address line a21 and input information across the write input line a22, respectively by activating the second and third gates s2 and s3 respectively. If a chaining operation is necessary the second write selector A2 of the second time control unit correspondingly cooperates with the write selector D of the instruction memory via the second address line a23 as described with reference to the cooperation of the first write selector A1 and the write selector D of the instruction memory.

The execution of time instructions of the tenths of a second level is performed in a similar manner as described hereinbefore with reference to the execution of time instructions on the seconds level. Again, chains of storage cells occupied by time instructions being executed at the same time are resolved and the respective time instructions are queued in a new order on the hundredths of a second level by means of the third series of storage units c30 to c39 of the third time control unit. All operations described above with reference to the higher levels will be performed accordingly based upon the third digit value forming addresses of the stored time instructions. As to be seen from the drawing, the third gate circuit T consisting of the three gates t1, t2 and t3 now controls the transfer operations on this level. Accordingly, the third gate circuit T is connected via another address line et to the read selector E of the instruction memory with the consequence that this selector E interprets data received on this line as coming from the output of the second counter B2 along the respective information line b22 and is set to read out the third digits of the execution time value of the respective fourth storage elements of the storage cells.

The execution of time instructions on the hundredths of a second level is somewhat different to the above-described execution operations. In the above-described cases the execution of a time instruction results in queuing operations on the next lower level without any effect outside of the central timer unit. The execution of a time instruction on the lowest level, however, results in delivering the control command to the addressed device. This is achieved as follows: During a call cycle the third counter B3 of the third time control unit is advanced step-wise and selector successively the storage units c30 to c39. The contents of a selected storage unit are read out destructively. This data forming an address for a storage of the instruction memory is transferred to the read selector E via the first gate u1 of the fourth gate circuit U and via a third address line eu connected to the input of the read selector E. Thereupon the read selector E selects the respective storage cell for reading the contents of the first fine storage elements h21 and h25, for example. The fifth storage element h25 contains the control command. In the second storage element h22 there is stored the address of the assigned switching device which has to perform the control operation. These data are transferred via the information output line e2 of the read selector E and the activated second gate u2 of the fourth gate circuit U to the output device XY of the central timer unit. This output device is composed of buffer registers X and Y for temporarily buffering the control command and the switching device address. Whence, these data are sent out via signal paths x and y.

Furthermore, the read selector E also reads out the seventh storage element h27 of the selected storage cell to obtaining the address of the next following storage cell in the chain in order to repeat the described operation for transmitting the read out data to the buffers registers X and Y, respectively. In following, this order all storage cells belonging to a chain are selected by the read selector E one after another. As soon as these reading operations for selected storage cells have been carried out the contents of the respective storage cell are erased.

A very frequent situation when one of the three digits of the execution time has a zero value has to be considered yet. This requires a procedure different to the normal queuing otherwise the proper execution time would be missed. If the read selector E encounters a tenths of a second value or a hundredths of a second value being zero when testing a read out digit value, the above described relinking of the respective storage cell on the next lower level is obviated. Therefore, if the test is positive the started queue operation is skipped and the read selector E takes from the selected storage cell immediately the next digit of the execution time value and performs the queue operation based upon the lower level value. If the third digit of the execution time value, stored in the fourth storage element of the storage cell is zero, any relinking of the respective storage member is obviated and the read selector E immediately starts the execution operation for the hundredths of a second level, as described above. The only difference is that the read selector E, in this case, directly activates the fourth gate circuit U for controlling the state of the second gate u2.

It may be noted that the above described operation of the adder L can be adjusted such that the tenths of a second value and the hundredths of a second value of the execution time value is set to zero. This may be done on purpose whenever time tolerance conditions with respect to a time instruction allow for setting a digit of the execution time value to the value zero. Preferably, such rounding of a digit will be made whenever it is possible, since then at least one of the queue operations is avoided whereby simplifying the control of the above described operation.

While the central timer unit herein described constitutes a preferred embodiment of the invention, it is to be understood that the invention is not limited to this precise circuitry and design. A variety of changes may be made without departing from the scope of the invention. Different applications may require other time spans for buffering time related information; it may also be reasonable to choose a different number of time control units with a different number of storage units to cover a longer time span or to have an even denser time pattern. Respective adjustments with a different clock pulse rate even with a call cycle base other than ten may be made without departing from the scope of the invention. It may also be understood that the capacity of the instruction memory, with respect to the length and the number of storage cells can be chosen to meet the requirements of different applications. It is also not necessary to store the entire information of a time instruction, as especially the first digit of the execution time value may be useless, and eliminating this digit from the stored information would save storage capacity. On the other hand, sometimes it is desirable to have the entire information of a time instruction available at execution time. This is reasonable whenever the execution time value itself is of importance to perform a control operation.

Referring to the circuitry design, it may be noted that besides rearrangements of the time characteristic of the time control units also the design of the associated writing and read selectors may be changed without departing from the scope of the invention. Above all, it is possible to assemble the write selectors into one unit servicing all series of storage units simultaneously. This and the capacity of the instruction memory and the specific design of the write selectors and the read selectors of the instruction memory depend on the requirements of the application and also on the used technology of respective electronic components and units.

What is claimed is:

1. A central timer unit of a telecommunication system for buffering pieces of control information received in random order and to be sent out after individual delay times associated with each respective piece of information, said timer unit comprising in combination:
    (a) a random access memory having storage cells, each storage cell designed for storing data of
        (1) a piece of control information and
        (2) a chain address of another storage cell containing another piece of control information to be read out at the same time;
    (b) a plurality of time control units each including:
        a series of storage units designed for storing a random access memory address; and
        read selector means for interrogating the associated series of storage units sequentially and repeatedly in accordance with an individually established operating rate;
        said time control units being arranged to form a multi-level hierarchy of clock units each representing by the state of its respective read selector means a digit of a current internal time value;
    (c) write selector means commonly assigned to the time control units for randomly selecting a storge unit by means of the most significant non-zero digit of the individual delay time value of a respective piece of control information and for storing therein the address of the storage cell selected for buffering the respective piece of control information; and
    (d) a control device having:
        an input buffer for temporarily storing incoming pieces of control information;
        an output device for transmitting outgoing pieces of control information; and
        control means for transmitting address data and data of a piece of control information from said input buffer to the write selector means and said random access memory, between said time control units and said random access memory, and from said random access memory to said output device;
    wherein the random access memory address of each piece of control information is handed down to the neighboring lower level time control unit of the hierarchy whenever at a respective digit of the internal storage time value the associated storage unit is selected said random access memory address is read out.

2. The central timer unit as recited in claim 1, further comprising:
    (a) a clock generator connected to the time control unit of lowermost order of the hierarchy, said clock unit running at highest operation rate;
    (b) said read selector means each including a ring counter for sequentially and repeatedly selecting one of the associated storage units; and
    (c) clock pulse lines, each connecting the ring counters of two neighboring time control units and transmitting a clock pulse signal from the faster running clock unit of the lower level in the hierarchy to the neighboring time control unit of higher level, said clock pulse signal derived from a carry signal occurring upon completing a cycle of the respective lower level ring counter.

3. The central timer unit as recited in claim 2, wherein said random access memory further comprises:
    (a) a write selector for the random access memory having a selection control input, address inputs, an information input and an address output; said selection control input connected to the control means to receive a start signal for selecting an empty storage cell; said address output connected to the control means for transmitting the address of the storage cell selected for storing a received piece of control information; and said address inputs connected to the said write selector means associated with the time control units for transmitting addresses of storage cells to be selected for performing an address chaining operation; and
    (b) a read selector for the random access memory having read address inputs, an information output and a chain address output; said read address inputs connected to the control means to receive a read address for controlling a read operation; said information output connected to the control means for transmitting information read out from the random access memory to the time control units and the output buffer, respectively; and said chain address output connected to the write selector of the random access memory for transmitting chain addresses if address chaining is to be performed.

4. The central timer unit as recited in claim 3, wherein the storage cells of the random access memory each comprise:
    (a) a first storage element for storing a device address;
    (b) a group of further storage elements, each designed for storing a digit value of an execution time value specified by a corresponding digit of a future internal storage time value;
    (c) another storage element for storing a control command;
    (d) two further storage elements, each designed for storing a forward chain address and a return chain address, respectively, wherein said forward chain address points to a successive storage cell and said return chain address points to a preceding storage cell of a string of storage cells storing pieces of control information to be executed at the same time.

5. The central timer unit as recited in claim 4, wherein the control device further comprises:
    (a) an internal time buffer connected to receive the current states of the ring counters and thus representing the respective digits of the internal storage time value;
    (b) an adder unit connected to said internal time buffer and to the input buffer for calculating the sum of a buffered delay time value and the current internal storage time value, said sum forming the execution time value of the incoming piece of control information and said adder unit further having an output buffer for temporarily storing the digit values of said sum.

6. The central timer unit as recited in claim 5, wherein the input buffer of the control device further comprises independently readable buffer elements for storing the control command specifying a control operation, for storing the address of a device of the telecommunication system which is to perform the control operation, and for storing a digit of the delay time value specifying a time span for buffering the control information, respectively.

7. The central timer unit as recited in claim 6, wherein the control means of the control device further comprise gate circuits composed of gate elements to be activated separately, wherein:
   (a) a first gate circuit is arranged between the buffer elements for storing the control command and the device address and the output buffer of the adder unit on one hand, and the write selector means associated with the time control units and with the random access memory, respectively, on the other hand;
   (b) second gate circuits each are arranged between a respective read selector of the time control units and the read selector of the random access memory, each one of said second gate circuits having a gate element connecting the read selector of a time control unit of one level with the respective address input of the read selector of the random access memory and each having further gate elements connecting the output of the read selector of the random access memory with the respective address inputs and data inputs of the write selector of the time control unit of the next lower level; and
   (c) a third gate circuit having one gate element connecting the output of the read selector of the lowermost time control unit with an address input of the read selector of the random access memory and having a second gate element connecting the output of the read selector of the random access memory with the output device.

8. A method for buffering pieces of control information received in random order in a central timer unit of a telecommunication system and to be sent out after an individually specified delay time with respect to an internal time base, comprising the steps of:
   (a) buffering temporarily an incoming piece of control information in an input buffer, said piece of control information including:
      a control command specifying the control operation
      an address of a device of the telecommunication system which is to perform the control operation; and
      a delay time value specifying a time span for buffering said piece of control information;
   (b) calculating an execution time value by forming the sum of the delay time value and a current internal storage time value by means of an adder unit;
   (c) identifying an empty storge cell of a random access memory and storing said piece of control information therein;
   (d) transmitting the address of the identified empty storage cell to a set of time control units arranged to form a multi-level hierarchy of clock units operating at different operating rates and representing in combination by their respective operating states a current internal storage time value, each time control unit having storage units being sequentially and repeatedly read out in accordance with the value of the respective digit of the internal storage time;
   (e) selecting by means of the most significant digit of the execution time value a corresponding storage unit of the time control unit of highest level and operating at the lowerst operating rate testing the status of said storage unit if it is empty; storing said selected random access memory address therein when the test is positive and reading the buffered memory address when the storage unit is occupied;
   (f) transmitting the buffered memory address to said random access memory for performing a chain operation in the random access memory by storing the random access memory address of the incoming piece of control information in the storage all associated with said buffered memory address and furthermore containing a previously buffered piece of control information;
   (g) selecting a storage unit of a time control unit associated with and determined by the respective digit value of the current internal storage time, reading the storge cell address stored therein, and transmitting the contents to said random access memory for selecting the storage cell associated therewith;
   (h) reading out of the selected storage cell the next lower digit value of the execution time; transmitting this data to the respective time control unit for selecting the storage unit specified by this data, and reading out the selected storage unit for testing if it is empty;
   (i) repeating the steps (f) through (h) for handing down the address of a buffered piece of control information to the next lower level time control unit whenever a storage unit is selected for a reading operation until the address is stored in the time control unit of lowest level; and
   (j) correspondingly selecting a storage unit of the lowest level time control unit, reading the stored address, selecting with this address the respective storage cell of said random access memory, reading the piece of control information including the control command and the device address buffered therein and transmitting the information to an output device for initiating the execution of the specified control operation by the addressed device of the telecommunication system.

9. The method for buffering pieces of control information as recited in claim 8, wherein the chain operation for a current piece of control information according to step (f) further includes:
   (f1) selecting the storage cell containing the previously buffered piece of control information assigned to be retrieved at the same digit value of the execution time by means of the transmitted address and reading out a storage element designated for storing a forward chain address pointing to a storage cell which is occupied by another previously buffered piece of control information associated with the same digit value of the execution time;
   (f2) selecting the storage cell of said random access memory specified by the forward chain address and reading out the storage element designated for storing a forward chain address;

(f3) repeating step (f2) until no forward chain address is found in the respective selected storage cell of the random access memory; and (f4) storing in the last selected storage cell as a new forward chain address the address of the storage cell containing the current piece of control information and in the latter storage cell as a return chain address the address of the storge cell previously forming the end member of the string of storage cells.

10. The method as recited in claim 9, for handing the address of a storage cell of the random access memory down to a time control unit of the next lower level wherein said step (h) includes the additional steps of:

(h1) reading out of the selected storage cell the next less significant digit value of the execution time, testing the value of the read out data; and transmitting this data to the respective time control unit if it is a non-zero value; and (h2) in case of a zero value, reading out of the selected storage cell the next less significant digit value; and (h3) repeating steps (h1) and (h2) until a non-zero value is found, and transmitting this data to the respective time control unit.

* * * * *